(12) United States Patent
Feltman et al.

(10) Patent No.: US 11,484,832 B2
(45) Date of Patent: Nov. 1, 2022

(54) APPARATUS AND METHOD FOR A CARBON REDUCTION ASSEMBLY

(71) Applicants: Astee, Inc., Chattanooga, TN (US); Municipal Enterprises Ltd., Bedford (CA)

(72) Inventors: Wendell Feltman, Hixson, TN (US); Kevin Risley, Chattanooga, TN (US); Patrick Rooney, Dartmouth (CA); Jerry Scott, Halifax (CA); Devin Frank Whitehead, Newport Station (CA); Malcolm Leland Swanson, Chickamauga, GA (US)

(73) Assignees: Astee, Inc., Chattanooga, TN (US); Municipal Enterprises Ltd., Bedford (CA)

( * ) Notice: Subject to any disclaimer, the term of this patent is extended or adjusted under 35 U.S.C. 154(b) by 0 days.

(21) Appl. No.: 17/570,615

(22) Filed: Jan. 7, 2022

(65) Prior Publication Data
US 2022/0212142 A1 Jul. 7, 2022

Related U.S. Application Data

(60) Provisional application No. 63/134,839, filed on Jan. 7, 2021.

(51) Int. Cl.
*B01D 53/48* (2006.01)
*B01D 53/75* (2006.01)
*B01D 53/77* (2006.01)

(52) U.S. Cl.
CPC ............. *B01D 53/75* (2013.01); *B01D 53/48* (2013.01); *B01D 53/77* (2013.01); *B01D 2251/102* (2013.01); *B01D 2257/30* (2013.01); *B01D 2257/50* (2013.01)

(58) Field of Classification Search
CPC ........ B01D 53/48; B01D 53/75; B01D 53/77; B01D 2257/30; B01D 2257/50; B01D 2251/102
See application file for complete search history.

(56) References Cited

U.S. PATENT DOCUMENTS

| | | |
|---|---|---|
| 2004/0123786 A1 | 7/2004 | Crafton et al. |
| 2012/0028200 A1 | 2/2012 | Hicks |
| 2013/0125792 A1 | 5/2013 | Fried |
| 2013/0269526 A1 | 10/2013 | Lustig et al. |
| 2015/0038321 A1 | 2/2015 | D'Amico et al. |

*Primary Examiner* — Timothy C Vanoy
(74) *Attorney, Agent, or Firm* — Chambliss, Bahner & Stophel, P.C.; Stephen D. Adams

(57) ABSTRACT

A carbon reduction assembly adapted for use with wet and dry coal combustion products ("CCPs"). The assembly includes a direct-fired carbon reduction section having a dry material inlet device that is adapted to receive the dry CCPs and a direct-fired carbon reduction section burner unit that is adapted to reduce carbon content in the dry CCPs. The assembly also includes a direct-fired dryer section that is operatively connected with the direct-fired carbon reduction section and has a wet material inlet device that is adapted to receive the wet CCPs and a direct-fired dryer section drum that is adapted to dry the wet CCPs. The assembly further includes a control unit that is operatively connected with the carbon reduction section and the dryer section. An amount of hot gas generated by the carbon reduction section is conveyed to the dryer section, and the assembly is adapted to produce dry fly ash.

20 Claims, 2 Drawing Sheets

APPARATUS AND METHOD FOR A CARBON REDUCTION ASSEMBLY

CROSS-REFERENCES TO RELATED APPLICATIONS/PATENTS

This application relates back to and claims the benefit of priority from U.S. Provisional Application for Patent Ser. No. 63/134,839 titled "Carbon Reduction Dryer" and filed on Jan. 7, 2021.

FIELD OF THE INVENTION

The present invention relates generally to apparatuses and methods drying fly ash, and particularly to apparatuses and methods for drying and reducing carbon in fly ash from coal combustion products ("CCPs").

BACKGROUND AND DESCRIPTION OF THE PRIOR ART

It is known to use apparatuses and methods to reduce or remove carbon from fly ash derived from CCPs. Conventional apparatuses and methods, however, suffer from one or more disadvantages. For example, conventional carbon reduction assemblies and methods are not adapted to process "new" CCPs from fresh dry ash, landfilled ash, and/or ponded ash derived from CCPs. As a result, conventional carbon reduction assemblies and methods are not adapted to process CCPs into usable ash (e.g., class F ash). Conventional carbon reduction assemblies and methods are also not sufficiently effective and economical. Conventional carbon reduction assemblies and methods also have undesirably low processing rates and capacity and undesirably high energy consumption and transportation costs. Further, conventional carbon reduction assemblies and methods do not sufficiently minimize carbon content in CCPs, remove water from CCPs, and adjust material gradation. Still further, conventional carbon reduction assemblies and methods are not sufficiently portable or easily transported. In addition, conventional carbon reduction assemblies and methods do not produce a high-temperature, oxygen-rich environment which oxidizes and reduces carbon content in CCPs. Conventional carbon reduction assemblies and methods also do not utilize hot gas generated by the carbon reduction section in the dryer section of the assembly. Further, conventional carbon reduction assemblies and methods do not include dry sorbent in a baghouse designed for capture and control of mercury oxides or mercury sulfates.

It would be desirable, therefore, if an apparatus and method for a carbon reduction assembly could be provided that would be adapted to process "new" CCPs from fresh ash, landfilled ash, and/or ponded ash derived from CCPs. It would also be desirable if such an apparatus and method for a carbon reduction assembly could be provided that would process CCPs into usable ash (e.g., class F ash). It would be further desirable if such an apparatus and method for a carbon reduction assembly could be provided that would be more effective and economical. It would be still further desirable if such an apparatus and method for a carbon reduction assembly could be provided that would improve processing rates and capacity and reduce energy consumption and transportation costs. In addition, it would be desirable if such an apparatus and method for a carbon reduction assembly could be provided that would minimize carbon content in CCPs, removes water from CCPs, and adjusts material gradation. It would also be desirable if such an apparatus and method for a carbon reduction assembly could be provided that would be highly portable and easily transported. Further, it would be desirable if such an apparatus and method for a carbon reduction assembly could be provided that would produce a high-temperature, oxygen-rich environment which oxidizes and reduces carbon content in CCPs. Still further, it would be desirable if such an apparatus and method could be provided that would utilize hot gas generated by the carbon reduction section in the dryer section of the assembly. In addition, it would be desirable if such an apparatus and method for a carbon reduction assembly could be provided that would include dry sorbent in the baghouse designed for capture and control of mercury oxides or mercury sulfates.

Advantages of the Preferred Embodiments of the Invention

Accordingly, it is an advantage of the preferred embodiments of the invention claimed herein to provide an apparatus and method for a carbon reduction assembly that is adapted to process "new" CCPs from fresh ash, landfilled ash, and/or ponded ash derived from CCPs. It is also an advantage of the preferred embodiments of the invention claimed herein to provide an apparatus and method for a carbon reduction assembly that processes CCP into usable ash (e.g., class F ash). It is another advantage of the preferred embodiments of the invention claimed herein to provide an apparatus and method for a carbon reduction assembly that is more effective and economical. For example, the preferred embodiments of the invention claimed herein improve processing rates and capacity and reduce energy consumption and transportation costs. It is still another advantage of the preferred embodiments of the invention claimed herein to provide an apparatus and method for a carbon reduction assembly that minimizes carbon content in CCPs, removes water from CCPs, and adjusts material gradation. It is yet another advantage of the preferred embodiments of the invention claimed herein to provide an apparatus and method for carbon reduction assembly that is highly portable and easily transported. In addition, it is an advantage of the preferred embodiments of the invention claimed herein to provide an apparatus and method for a carbon reduction assembly that produces a high-temperature, oxygen-rich environment which oxidizes and reduces carbon content in CCPs. It is an additional advantage of the preferred embodiments of the invention claimed herein to provide an apparatus and method for a carbon reduction assembly that utilizes hot gas generated by the carbon reduction section in the dryer section of the assembly. It is also an advantage of the preferred embodiments of the invention claimed herein to provide an apparatus and method for a carbon reduction assembly that includes dry sorbent in the baghouse designed for capture and control of mercury oxides or mercury sulfates.

Additional advantages of the preferred embodiments of the invention will become apparent from an examination of the drawings and the ensuing description.

Explanation of the Technical Terms

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "attached," "connected," and "interconnected," refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

As used herein, the term "classifier" means any device, mechanism, assembly or combination thereof that is adapted to classify, separate, or sort particles and mixtures into constituent parts by size and/or density. The term "classifier" includes, without limitation, screens, sieves, air classifiers, cyclones, air-sweep mills, fluidized beds, centrifuges, air elutriation, and the like.

As used herein, the term "control unit" means any device, mechanism, assembly or combination thereof that is adapted to control or supervise the operation of the assembly, receive and interpret program instructions, send control signals, and/or route data throughout the assembly. The term "control unit" includes, without limitation, control processing units, microprocessors, monitoring processors, SCADA systems, PLC systems, alarm monitoring, algorithms, and the like.

As used herein, the term "material inlet device" means any device, mechanism, assembly or combination thereof that is adapted to receive material, including wet and dry CCPs, into the assembly. The term "material inlet device" includes, without limitation, hoppers, feeders, gate valves, rotary airlocks, rotary feeders, single/double flap valves, slide/knife gate valves, and the like.

As used herein, the term "particle size reduction unit" means any device, mechanism, assembly or combination thereof that is adapted to reduce the size of particles, including wet and dry CCPs. The term "particle size reduction unit" includes, without limitation, crushers, grinders, ball mills, rod mills, tower mills, tube mills, pebble mills, pin mills, hammer/screen mills, and the like.

As used herein, the term "storage unit" means any device, mechanism, assembly or combination thereof that is adapted to store or house material, including fly ash. The term "storage unit" includes, without limitation, silos, bins, rail cars, road transport tankers, bags, tanks, and the like.

As used herein, the term "weighing device" means any device, mechanism, assembly or combination thereof that is adapted to weigh material, including fly ash and wet and dry CCPs. The term "weighing device" includes, without limitation, belt scales, load cells, weight belt feeders, optical belt scales, and the like.

SUMMARY OF THE INVENTION

The apparatus of the invention comprises a carbon reduction assembly adapted for use with wet and dry coal combustion products ("CCPs"). The preferred assembly comprises a direct-fired carbon reduction section. The preferred direct-fired carbon reduction section comprises a dry material inlet device that is adapted to receive the dry CCPs and a direct-fired carbon reduction section burner unit that is disposed upstream from the dry material inlet device and adapted to reduce carbon content in the dry CCPs. The preferred assembly also comprises a direct-fired dryer section. The preferred direct-fired dryer section is operatively connected with the direct-fired carbon reduction section and comprises a wet material inlet device that is adapted to receive the wet CCPs and a direct-fired dryer section drum that is adapted to dry the wet CCPs. The preferred assembly further comprises a control unit that is operatively connected with the direct-fired carbon reduction section and the direct-fired dryer section. In the preferred assembly, an amount of hot gas generated by the direct-fired carbon reduction section is conveyed to the direct-fired dryer section, and the assembly is adapted to produce dry fly ash.

The method of the invention comprises a method for removing carbon from fly ash derived from wet and dry CCPs. The preferred method comprises providing a carbon reduction assembly. The preferred carbon reduction assembly comprises a carbon reduction assembly adapted for use with wet and dry coal combustion products ("CCPs"). The preferred assembly comprises a direct-fired carbon reduction section. The preferred direct-fired carbon reduction section comprises a dry material inlet device that is adapted to receive the dry CCPs and a direct-fired carbon reduction section burner unit that is disposed upstream from the dry material inlet device and adapted to reduce carbon content in the dry CCPs. The preferred assembly also comprises a direct-fired dryer section. The preferred direct-fired dryer section is operatively connected with the direct-fired carbon reduction section and comprises a wet material inlet device that is adapted to receive the wet CCPs and a direct-fired dryer section drum that is adapted to dry the wet CCPs. The preferred assembly further comprises a control unit that is operatively connected with the direct-fired carbon reduction section and the direct-fired dryer section. In the preferred assembly, an amount of hot gas generated by the direct-fired carbon reduction section is conveyed to the direct-fired dryer section, and the assembly is adapted to produce dry fly ash. The preferred method also comprises removing carbon from the fly ash derived from wet and dry CCPs.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
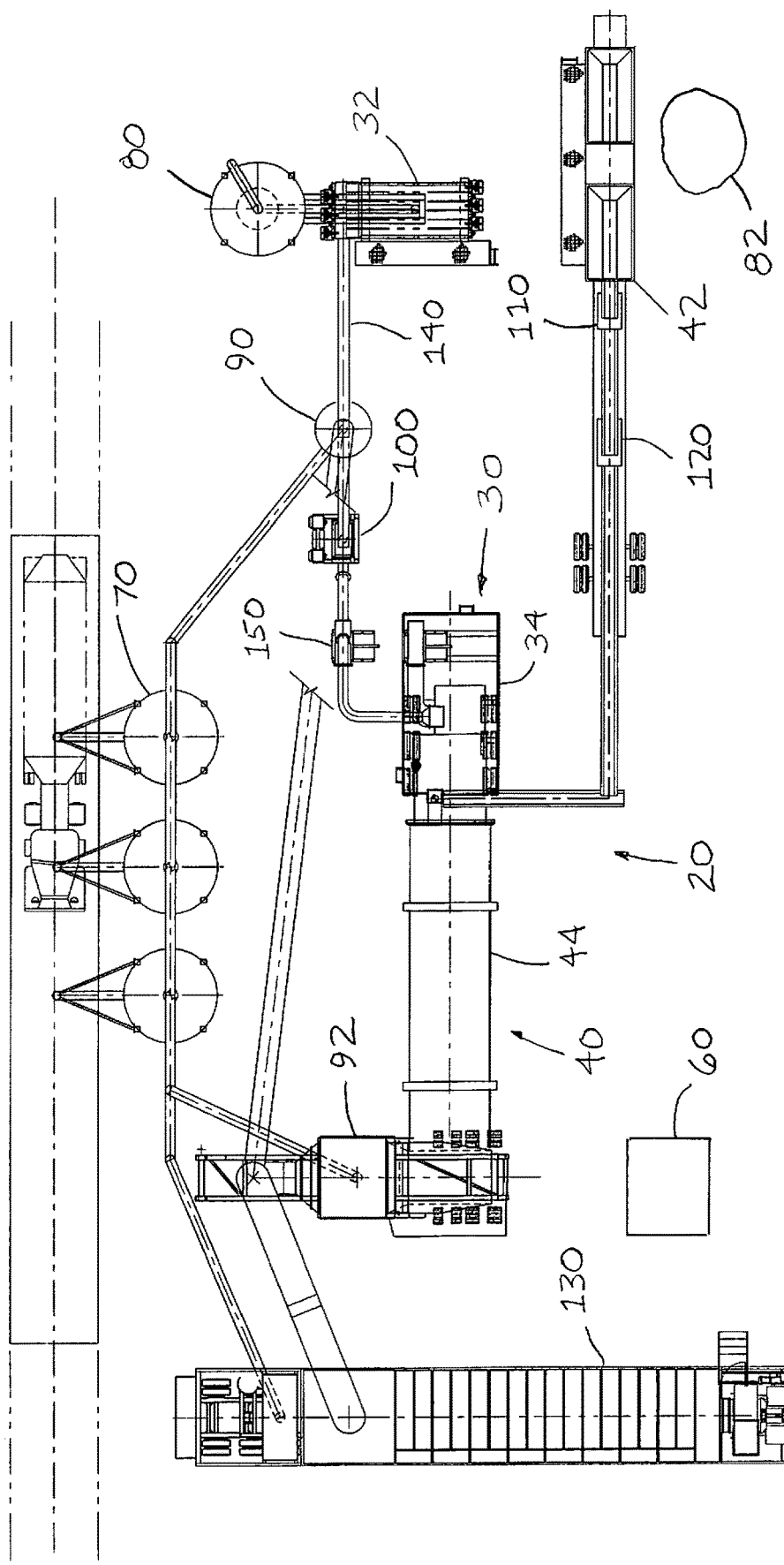
FIG. 1 is a plan view of the preferred carbon reduction assembly in accordance with the present invention.
Figure 2:
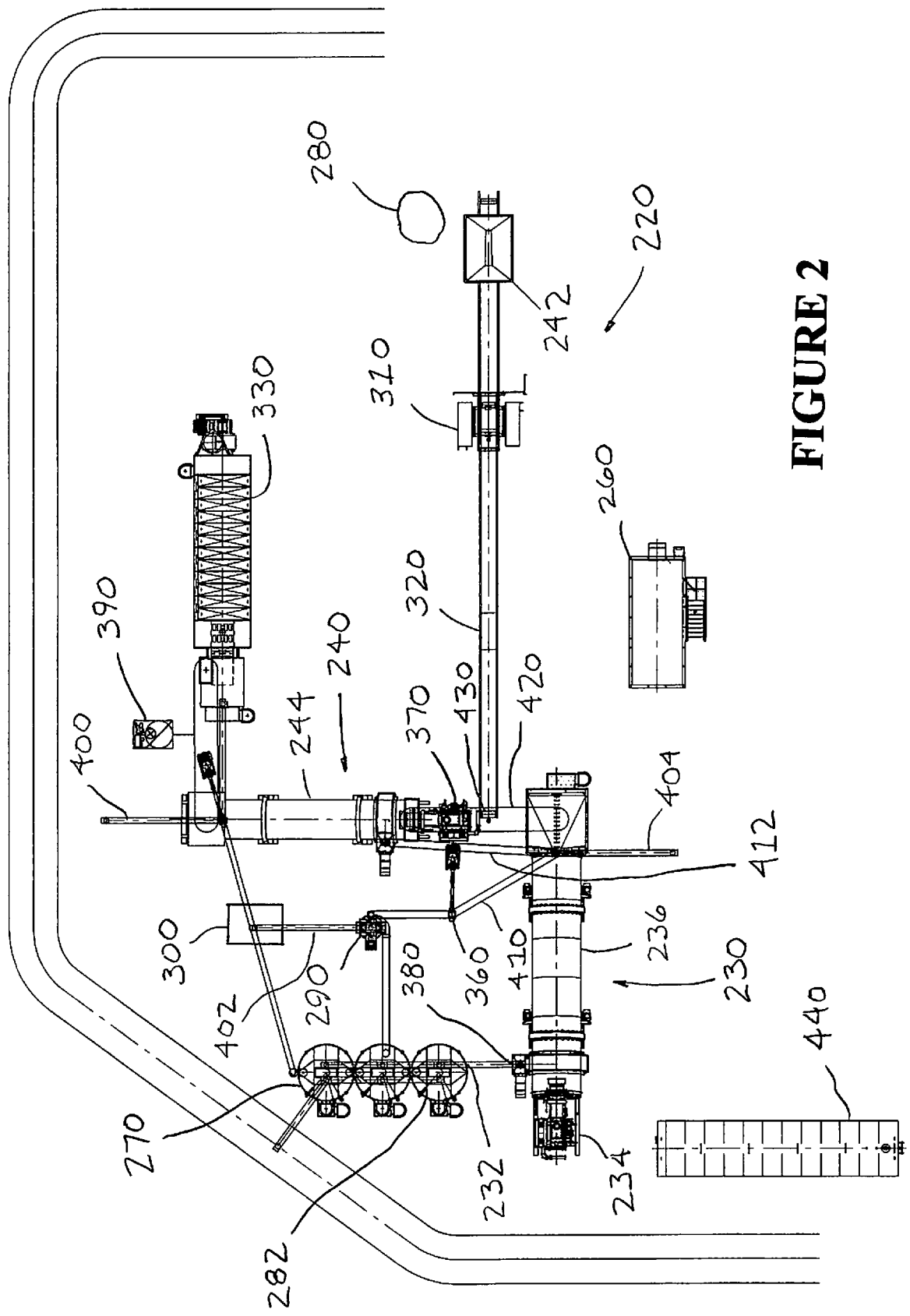
FIG. 2 is a plan view of a first alternative embodiment of the carbon reduction assembly in accordance with the invention.

Referring now to the drawings, the preferred embodiments of the carbon reduction assembly in accordance with the present invention are illustrated by FIGS. 1 through 2. Referring now to FIG. 1, a plan view of the preferred carbon reduction assembly in accordance with the present invention is illustrated. As shown in FIG. 1, the preferred carbon reduction assembly is designated generally by reference numeral 20. Preferred carbon reduction assembly 20 is adapted for use with wet and dry coal combustion products ("CCPs"). Preferred carbon reduction assembly 20 comprises direct-fired carbon reduction section 30 having dry material inlet device 32 which is adapted to receive the dry CCPs and direct-fired carbon reduction section burner unit 34 that is disposed upstream from the dry material inlet device and is adapted to reduce carbon content in the dry CCPs.

Still referring to FIG. 1, preferred carbon reduction assembly 20 also comprises direct-fired dryer section 40 which is operatively connected with direct-fired carbon reduction section 30. Preferred direct-fired dryer section 40 comprises wet material inlet device 42 which is adapted to receive the wet CCPs and direct-fired dryer section drum 44 which is adapted to dry the wet CCPs. Preferably, direct-fired dryer section drum 44 comprises a rotary dryer drum.

Still referring to FIG. 1, preferred carbon reduction assembly 20 further comprises control unit 60 which is operatively connected with direct-fired carbon reduction section 30 and direct-fired dryer section 40. Preferably, control unit 60 is also operatively connected with each of the elements of carbon reduction assembly 20, including without limitation, the classifiers, the coolers, the particle reduction device, the baghouse, and the like. In preferred carbon reduction assembly 20, an amount of hot gas generated by direct-fired carbon reduction section 30 is conveyed to direct-fired dryer section 40, and the assembly is adapted to produce dry fly ash.

Still referring to FIG. 1, preferred carbon reduction assembly 20 still further comprises finished product storage unit 70 which is adapted to store an amount of the dry fly ash. In addition, preferred carbon reduction assembly 20 comprises carbon reduction feed material storage unit 80 which is adapted to store an amount of the wet CCPs. Preferred carbon reduction assembly 20 also comprises dryer feed material storage unit 82 which is adapted to store an amount of the dry CCPs.

Still referring to FIG. 1, preferred carbon reduction assembly 20 also comprises first classifier 90 which is disposed downstream from the dry material inlet device and adapted to classify or sort an amount of the dry CCPs. Preferred carbon reduction assembly 20 also comprises second classifier 92 which is disposed downstream from the direct-fired dryer section drum and adapted to classify an amount of the dry CCPs. Preferred carbon reduction assembly 20 further comprises particle size reduction unit 100 which is adapted to reduce the particle size of an amount of the dry CCPs from the classifier that are oversized and is disposed downstream from classifier 90 and direct-fired dryer section drum 44. Preferred carbon reduction assembly 20 still further comprises screen 110 which is disposed downstream from wet material inlet device 42.

Still referring to FIG. 1, preferred carbon reduction assembly 20 also comprises first weighing device 120 which is disposed upstream from direct-fired dryer section 40. Preferred carbon reduction assembly 20 further comprises baghouse 130 which is disposed downstream from direct-fired dryer section 40. Preferred carbon reduction assembly 20 still further comprises auger 140 and fan 150. It is contemplated within the scope of the invention that auger 140 and fan 150 may be any suitable conveyance devices. While FIG. 1 illustrates the preferred configuration and arrangement of carbon reduction assembly 20, it is contemplated within the scope of the invention that the carbon reduction assembly may be of any suitable configuration and arrangement.

Referring now to FIG. 2, a plan view of a first alternative embodiment of the carbon reduction assembly in accordance with the invention is illustrated. As shown in FIG. 2, the preferred carbon reduction assembly is designated generally by reference numeral 220. Preferred carbon reduction assembly 220 comprises direct-fired carbon reduction section 230 having dry material inlet device 232 which is adapted to receive the dry CCPs, direct-fired carbon reduction section burner unit 234 that is disposed upstream from the dry material inlet device and is adapted to reduce carbon content in the dry CCPs, and carbon reduction section drum 236. Preferably, carbon reduction section drum 236 comprises a rotary drum.

Still referring to FIG. 2, preferred carbon reduction assembly 220 also comprises direct-fired dryer section 240 which is operatively connected with direct-fired carbon reduction section 230. Preferred direct-fired dryer section 240 comprises wet material inlet device 242 which is adapted to receive the wet CCPs and direct-fired dryer section drum 244 which is adapted to dry the wet CCPs. Preferably, direct-fired dryer section drum 244 comprises a rotary dryer drum.

Still referring to FIG. 2, preferred carbon reduction assembly 220 further comprises control unit 260 which is operatively connected with direct-fired carbon reduction section 230 and direct-fired dryer section 240. In preferred carbon reduction assembly 220, an amount of hot gas generated by direct-fired carbon reduction section 230 is conveyed to direct-fired dryer section 240, and the assembly is adapted to produce dry fly ash.

Still referring to FIG. 2, preferred carbon reduction assembly 220 still further comprises finished product storage unit 270 which is adapted to store an amount of the dry fly ash. In addition, preferred carbon reduction assembly 220 comprises carbon reduction feed material storage unit 280 which is adapted to store an amount of the dry CCPs. Preferred carbon reduction assembly 220 also comprises dryer feed material storage unit 282 which is adapted to store an amount of the dry CCPs.

Still referring to FIG. 2, preferred carbon reduction assembly 220 also comprises classifier 290 which is adapted to classify or sort an amount of the dry CCPs. Preferred carbon reduction assembly 220 further comprises particle size reduction unit 300 which is adapted to reduce the particle size of an amount of the dry CCPs from the classifier that are oversized and is disposed downstream from classifier 290 and direct-fired dryer section drum 244. Preferred carbon reduction assembly 220 still further comprises screen 310 which is disposed downstream from wet material inlet device 242.

Still referring to FIG. 2, preferred carbon reduction assembly 220 also comprises first weighing device 320 which is disposed upstream from direct-fired dryer section 240. Preferred carbon reduction assembly 220 further comprises baghouse 330 which is disposed downstream from direct-fired dryer section 240.

Still referring to FIG. 2, preferred carbon reduction assembly 220 also comprises cooler 360 which is disposed downstream from direct-fired carbon reduction section 230 and is adapted to cool an amount of the dry fly ash. Preferred carbon reduction assembly 220 further comprises supplemental burner unit 370 which is operatively connected with direct-fired dryer section drum 240, second weighing device 380 which is disposed upstream from direct-fired carbon reduction section 230, and exhaust gas cooling device 390 which is disposed downstream from direct-fired dryer section drum 244 and is adapted to cool exhaust from the direct-fired dryer section drum.

Still referring to FIG. 2, preferred carbon reduction assembly 220 also comprises residual screws 400, 402, and 404 which are disposed downstream from direct-fired dryer section drum 244, classifier 290, and direct-fired carbon reduction section burner unit 234, respectively.

Preferred residual screws 400, 402, and 404 are adapted to convey by-product away from direct-fired dryer section drum 244, classifier 290, and direct-fired carbon reduction section burner unit 234, respectively. Preferred carbon reduction assembly 220 further comprises discharge screws 410 and 412 which are adapted to convey material from direct-fired carbon reduction section 230. Preferred carbon reduction assembly 220 still further comprises heat duct 420 which is operatively connected with direct-fired carbon reduction section 230. In addition, preferred carbon reduction assembly 220 comprises a conveyance device such as slinger 430 with is operatively connected with direct-fired dryer section 240. Preferred carbon reduction assembly 220 also comprises fuel source 440.

While FIG. 2 illustrates the preferred configuration and arrangement of carbon reduction assembly 220, it is contemplated within the scope of the invention that the carbon reduction assembly may be of any suitable configuration and arrangement.

The invention also comprises a method for removing carbon from fly ash derived from wet and dry CCPs. The preferred method comprises providing a carbon reduction assembly. The preferred carbon reduction assembly comprises a carbon reduction assembly adapted for use with wet and dry coal combustion products ("CCPs"). The preferred assembly comprises a direct-fired carbon reduction section. The preferred direct-fired carbon reduction section comprises a dry material inlet device that is adapted to receive the dry CCPs and a direct-fired carbon reduction section burner unit that is disposed upstream from the dry material inlet device and adapted to reduce carbon content in the dry CCPs. The preferred assembly also comprises a direct-fired dryer section. The preferred direct-fired dryer section is operatively connected with the direct-fired carbon reduction section and comprises a wet material inlet device that is adapted to receive the wet CCPs and a direct-fired dryer section drum that is adapted to dry the wet CCPs. The preferred assembly further comprises a control unit that is operatively connected with the direct-fired carbon reduction section and the direct-fired dryer section. In the preferred assembly, an amount of heat from the direct-fired carbon reduction section is conveyed to the direct-fired dryer section, and the assembly is adapted to produce dry fly ash. The preferred method also comprises removing carbon from the fly ash derived from wet and dry CCPs.

In other preferred embodiments of the method of the invention, the method further comprises sizing the dry fly ash, sizing the dry CCPs, removing water from wet CCPs, and/or removing mercury from exhaust gas derived from the wet CCPs and the dry CCPs.

In operation, several advantages of the preferred embodiments of the apparatus and method for a carbon reduction assembly are achieved. For example, the preferred embodiments of the invention claimed herein provide an apparatus and method for a carbon reduction assembly that is adapted to process "new" CCPs from fresh ash, landfilled ash, and/or ponded ash derived from CCPs. The preferred embodiments of the invention claimed herein also provide an apparatus and method for a carbon reduction assembly that processes CCP into usable ash (e.g., class F ash). The preferred embodiments of the invention claimed herein further provide an apparatus and method for a carbon reduction assembly that is more effective and economical. For example, the preferred embodiments of the invention claimed herein improve processing rates and capacity and reduce energy consumption and transportation costs. The preferred embodiments of the invention claimed herein still further provide an apparatus and method for a carbon reduction assembly that minimizes carbon content in CCPs, removes water from CCPs, and adjusts material gradation. In addition, the preferred embodiments of the invention claimed herein provide an apparatus and method for carbon reduction assembly that is highly portable and easily transported. The preferred embodiments of the invention claimed herein also provide an apparatus and method for a carbon reduction assembly that produces a high-temperature, oxygen-rich environment which oxidizes and reduces carbon content in CCPs. The preferred embodiments of the invention claimed herein further provide an apparatus and method for a carbon reduction assembly that utilizes hot gas generated by the carbon reduction section in the dryer section of the assembly. The preferred embodiments of the invention claimed herein still further provide an apparatus and method for a carbon reduction assembly that includes dry sorbent in the baghouse designed for capture and control of mercury oxides or mercury sulfates.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A carbon reduction assembly adapted for use with wet and dry coal combustion products ("CCPs"), said assembly comprising:
   (a) a direct-fired carbon reduction section, said direct-fired carbon reduction section comprising:
      (i) a dry material inlet device, said dry material inlet device being adapted to receive the dry CCPs;
      (ii) a direct-fired carbon reduction section burner unit, said direct-fired carbon reduction section burner unit being disposed upstream from the dry material inlet device and being adapted to reduce carbon content in the dry CCPs;
   (b) a direct-fired dryer section, said direct-fired dryer section being operatively connected with the direct-fired carbon reduction section and comprising:
      (i) a wet material inlet device, said wet material inlet device being adapted to receive the wet CCPs;

(ii) a direct-fired dryer section drum, said direct-fired dryer section drum being adapted to dry the wet CCPs;

(c) a control unit, said control unit being operatively connected with the direct-fired carbon reduction section and the direct-fired dryer section;

wherein an amount of hot gas generated by the direct-fired carbon reduction section is conveyed to the direct-fired dryer section; and wherein the assembly is adapted to produce dry fly ash.

2. The carbon reduction assembly of claim 1 further comprising a finished product storage unit, said finished product storage unit being adapted to store an amount of the dry fly ash.

3. The carbon reduction assembly of claim 1 further comprising a carbon reduction feed material storage unit, said carbon reduction feed material storage unit being adapted to store an amount of the dry CCPs.

4. The carbon reduction assembly of claim 1 further comprising a dryer feed material storage unit, said dryer feed material storage unit being adapted to store an amount of the wet CCPs.

5. The carbon reduction assembly of claim 1 further comprising a cooler, said cooler being disposed downstream from the direct-fired carbon reduction section and being adapted to cool an amount of the dry fly ash.

6. The carbon reduction assembly of claim 1 further comprising a first classifier, said first classifier being disposed downstream from the dry material inlet device and adapted to classify an amount of the dry CCPs.

7. The carbon reduction assembly of claim 1 further comprising a second classifier, said second classifier being disposed downstream from the direct-fired dryer section drum and adapted to classify an amount of the wet CCPs.

8. The carbon reduction assembly of claim 1 further comprising a particle size reduction unit, said particle size reduction unit being adapted to reduce the particle size of an amount of the dry CCPs from the classifier that are oversized and being disposed downstream from the classifier and the direct-fired dryer section drum.

9. The carbon reduction assembly of claim 1 further comprising a supplemental burner unit, said supplemental burner unit being operatively connected with the direct-fired dryer section drum.

10. The carbon reduction assembly of claim 1 further comprising a first weighing device, said first weighing device being disposed upstream from the direct-fired dryer section.

11. The carbon reduction assembly of claim 1 further comprising a second weighing device, said second weighing device being disposed upstream from the direct-fired carbon reduction section.

12. The carbon reduction assembly of claim 1 further comprising a baghouse, said baghouse being disposed downstream from the direct-fired dryer section.

13. The carbon reduction assembly of claim 1 further comprising an exhaust gas cooling device, said exhaust gas cooling device being disposed downstream from the direct-fired dryer section drum and being adapted to cool exhaust from the direct-fired dryer section drum.

14. The carbon reduction assembly of claim 1 wherein the direct-fired dryer section drum comprises a rotary dryer drum.

15. A carbon reduction assembly adapted for use with wet and dry coal combustion products ("CCPs"), said assembly comprising:

(a) a direct-fired carbon reduction section, said direct-fired carbon reduction section comprising:
(i) a dry material inlet device, said dry material inlet device being adapted to receive the dry CCPs;
(ii) a direct-fired carbon reduction section burner unit, said direct-fired carbon reduction section burner unit being disposed upstream from the dry material inlet device and being adapted to reduce carbon content in the dry CCPs;
(iii) a direct-fired carbon reduction section drum, said direct-fired carbon reduction section drum being operatively connected with the direct-fired carbon reduction section burner unit;

(b) a direct-fired dryer section, said direct-fired dryer section being operatively connected with the direct-fired carbon reduction section and comprising:
(i) a wet material inlet device, said wet material inlet device being adapted to receive the wet CCPs;
(ii) a direct-fired dryer section drum, said direct-fired dryer section drum being adapted to dry the wet CCPs;

(c) a control unit, said control unit being operatively connected with the direct-fired carbon reduction section and the direct-fired dryer section;

wherein an amount of hot gas generated by the direct-fired carbon reduction section is conveyed to the direct-fired dryer section; and wherein the assembly is adapted to produce dry fly ash.

16. A method for removing carbon from fly ash derived from wet and dry CCPs, said method comprising:

(a) providing a carbon reduction assembly, said assembly comprising:
(i) a direct-fired carbon reduction section, said direct-fired carbon reduction section comprising:
(1) a dry material inlet device, said dry material inlet device being adapted to receive the dry CCPs;
(2) a direct-fired carbon reduction section burner unit, said direct-fired carbon reduction section burner unit being disposed upstream from the dry material inlet device and being adapted to reduce carbon content in the dry CCPs;
(ii) a direct-fired dryer section, said direct-fired dryer section being operatively connected with the direct-fired carbon reduction section and comprising:
(1) a wet material inlet device, said wet material inlet device being adapted to receive the wet CCPs;
(2) a direct-fired dryer section drum, said direct-fired dryer section drum being adapted to dry the wet CCPs;
(iii) a control unit, said control unit being operatively connected with the direct-fired carbon reduction section and the direct-fired dryer section;
wherein an amount of hot gas generated by the direct-fired carbon reduction section is conveyed to the direct-fired dryer section; and wherein the assembly is adapted to produce dry fly ash; and, (b) removing carbon from the fly ash derived from the wet and dry CCPs.

17. The method of claim 16 further comprising sizing the dry fly ash.

18. The method of claim 16 further comprising sizing the dry CCPs.

19. The method of claim 16 further comprising removing water from wet CCPs.

20. The method of claim 16 further comprising removing mercury from exhaust gas derived from the wet CCPs and the dry CCPs.

* * * * *